United States Patent [19]
Jones

[11] 3,800,040
[45] Mar. 26, 1974

[54] METHODS FOR CONTROLLING RODENT POPULATIONS USING SUBSTITUTED DIQUINOLYDISULFIDES

[75] Inventor: Reuben G. Jones, Indianapolis, Ind.

[73] Assignee: Eli Lilly and Company, Indianapolis, Ind.

[22] Filed: Sept. 1, 1971

[21] Appl. No.: 177,086

[52] U.S. Cl.................................... 424/258, 424/84
[51] Int. Cl. .......................... A01n 9/12, A01n 9/22
[58] Field of Search ........... 424/258, 84; 260/283 S, 260/283 BI, 287

[56] References Cited
UNITED STATES PATENTS
2,430,679  11/1947  Jenkins .......................... 260/288 R

OTHER PUBLICATIONS

Christian et al., Journal of the American Pharmaceutical Association, 34 (1945) pages 147–149.

Christian et al., Journal of the American Pharmaceutical Association, 35 (1946) pages 328–335.

*Primary Examiner*—Albert T. Meyers
*Assistant Examiner*—Allen J. Robinson
*Attorney, Agent, or Firm*—Everet F. Smith

[57] ABSTRACT

Rodenticidal compositions and methods in which a 5,5'-disubstituted 8,8'-diquinolyl disulfide is the rodenticidally active ingredient.

3 Claims, No Drawings

METHODS FOR CONTROLLING RODENT POPULATIONS USING SUBSTITUTED DIQUINOLYDISULFIDES

BACKGROUND OF THE INVENTION

The present invention relates to improved rodenticidal compositions of matter and to methods of controlling rodent population.

Various species of rodents produce a severe impact on society in terms both of economic loss and disease spread. Rats, for example, consume large amounts of grain and other foods and contaminate many times the amount of food as is actually consumed. Rats also destroy and damage other valuable property, such as various species of poultry, including chickens and turkeys. Moreover, rodents are known as carriers of disease-causing organisms whch affect both man and various desirable animals. For these reasons, vast sums of money have been consumed in addition to extensive time and effort in attempting to prevent or at least to minimize the various forms of destruction and damage caused by rodents.

A most satisfactory rodenticide is one which, while effective in exterminating the rodent population, will nevertheless be at least relatively safe to man and various desirable animal species. The development of a rodenticide which successfully destroys rodent pests while remaining relatively safe to man and other valuable animals has been an extremely difficult task.

Rodenticides known as "single feeding" baits have been widely used. These however are generally highly toxic substances, and, although they accomplish the intended rodent destruction, they are correspondingly highly dangerous both to man and to other animal species. For this reason, "single feeding" rodenticides have generally been avoided and in many instances have been found to be entirely unsatisfactory.

In recent years, "multiple feeding" type rodenticides have been developed. As the term implies, the rodent must on more than one occasion take the poisoned bait. Operating on a cumulative action principle, only after multiple feedings will the rodent have consumed sufficient quantities of the poison to achieve a lethal effect. However, rats, for example, are generally suspicious creatures. A rodent poison will be rejected by a rat if the poison is in some manner detectable by the rat. Such detection can result either from the bait being rendered unpalatable by reason of the presence of the poison or by an undesirable, though not lethal, physiological reaction from intake of the poison. Either of these effects will generally give rise to a discontinuance of feeding at the poisoned bait site. Furthermore, other rats will likewise refuse to avail themselves of the poisoned bait upon noticing the adverse reaction of those rats which have fed upon the bait.

An acceptable "multiple feeding" type rodenticide therefore will exhibit the characteristics of, first, being especially lethal to rodents or specific classes of rodents, secondly, being palatable to the rodent when incorporated into the poisoned bait or at least not destroying palatability of the poisoned bait, and thirdly, being sufficiently slow-acting so as to avoid the development of suspicion in the rodent which has consumed the poisoned bait as well as in other rodents of the colony until lethal quantities of the poisoned bait have been consumed by all of the rodents of the colony.

This invention is directed to a rodenticide which exhibits all three of the above characteristics. This rodenticide exhibits especially high toxicity to rats while being relatively less toxic to other animal species. It is furthermore relatively undetectable from the standpoint of odor or taste when present in bait in a suitable concentration. Moreover, the poison is sufficiently slow acting so that its physiological effect is not noticed by the rats until lethal quantities have been consumed by the rat colony.

The active substance which is present in the rodenticidal compositions of the invention is any of certain bis-(5-substituted-8-quinolyl)disulfides. The prior art has disclosed compounds having a structure similar to that of the substances used in the rodenticidal composition of this invention. Specifically, one of these compounds, bis(5-acetamido-8-quinolyl)disulfide, has been mentioned in Christian et al., *Journal of the American Pharmaceutical Association*, 34 (1945), 147–149; Christian et al., *Journal of the American Pharmaceutical Association* 35 (1946), 328–335; and Jenkins et al., U.S. Pat. No. 2,430,679. In these publications, this compound, along with others, was tested for activity as an antimalarial agent. Nowhere in any of these publications, however, is there any disclosure or teaching which could give rise to the expectation that bis(5-acetamido-8-quinolyl)disulfide might be active as a rodenticide.

SUMMARY OF THE INVENTION

This invention is directed to rodenticidal compositions and to a method for controlling the rodent population.

The rodenticidal composition of this invention comprises an edible carrier and an effectively toxic amount of a substituted diquinolyl disulfide having the formula

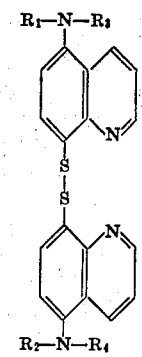

in which $R_1$ and $R_2$ are hydrogen or

in which R is selected from the group consisting of hydrogen, methyl, ethyl, trifluoromethyl and 2-furyl, and $R_3$ and $R_4$ each are independently selected from the group consisting of hydrogen, formyl, acetyl, 2-furyl, trifluoroacetyl and propionyl.

This invention furthermore is directed to a method of controlling rodent population which comprises positioning the above-defined rodenticidal composition in areas inhabited by rodents.

DETAILED DESCRIPTION OF THE INVENTION

The substituted diquinolyl disulfides which are active ingredients in the rodenticidal composition of this invention exhibit unusual and unexpected properties which render them peculiarly suitable in eliminating rodents.

The toxicity of the substituted diquinolyl disulfides is substantially greater with respect to rats than with respect to other animal species and even to other rodent species, including, for example, mice. Although toxic to mice, the dosage levels at which the substituted diquinolyl disulfides must be administered are substantially greater than those which are efficacious in controlling rat infestation. With respect to other animal species, such as cats, dogs, farm animals, and man himself, the substituted diquinolyl disulfides are comparatively less toxic at the usually employed dosage levels.

Of added special advantage is the fact that the substituted diquinolyl disulfides are especially effective in eliminating warfarin-resistant rats. Rats which exhibit a resistance to treatment with warfarin have presented a serious problem in some parts of the world. The principal previously recognized effective rodenticide for warfarin-resistant rats has been zinc phosphide, and it has been employed generally only as a last resort since it is an extremely toxic substance, lethal not only to rodents but to man and other animal species as well. The substituted diquinolyl disulfides of this invention thus offer a highly attractive and preferred alternative to zinc phosphide in treating warfarin-resistant rats.

In the rodenticidal composition of this invention, the substituted diquinolyl disulfide is incorporated on an edible carrier. By "edible carrier" is meant any substrate which will undergo substantial digestion and assimilation in the ingesting animal's body and will serve as an attractant in inducing the rodent to consume lethal quantities of the substituted diquinolyl disulfide. The edible carrier therefore can be comprised of any conveniently available edible substance, such as, for example, bread, fish, meat, flour, cereal, grain, and the like. Vegetable or animal oils also may be employed, for example, corn oil or ground nut oil, and these may be used in addition to or in place of other edible substrates. Other substances which attract rodents can likewise be included in the rodenticidal composition of this invention. These may include, for example, sugar or chocolate.

Typically, the diquinolyl disulfide will be pulverized and then admixed with the selected edible carrier to achieve a relatively uniform concentration of the active ingredient throughout the carrier. However, the substituted diquinolyl disulfide first may be mixed with a portion of the edible carrier and subsequently more edible carrier added to achieve the intended overall concentration of active ingredient. Such a composition can be prepared, for example, by pulverizing the substituted diquinolyl disulfide, coating pieces of edible carrier, such as bread, cake crumbs, cat food, flour, oatmeal, or wheat, with the pulverized diquinolyl disulfide, and adding more of the edible carrier as well as any other attracting ingredients, such as sugar or chocolate. The overall composite is then mixed to achieve a relatively uniform spread of the active lethal ingredient throughout the composition.

The actual mixing of the substituted diquinolyl disulfides with the edible carrier can be accomplished in any suitable manner. Certain of the methods available for achieving intermixing are, for example, by physically blending the active ingredient with the edible carrier, by dissolving the active ingredient in an appropriate volatile solvent and spraying the solution onto the edible carrier with evaporation of the solvent or by suspending or dissolving the substituted diquinolyl disulfide in an edible oil, such as corn oil, and using the resulting composition in that form or mixing the edible oil containing substituted diquinolyl disulfide with a solid edible carrier.

The disulfide will be present in the edible carrier in an amount which is effectively toxic to the rodents when the rodents feed on the composition over an extended period and on multiple occasions. Generally, when administered to rats, the disulfide will be present in the edible carrier in an amount of from about 0.01 percent to about 0.3 percent by weight. Preferably, the disulfide will be present in the carrier in an amount of from about 0.03 percent to about 0.1 percent by weight. These concentrations will provide sufficient disulfide to be lethal to rats while remaining relatively harmless to other animal species.

Compositions containing the substituted diquinolyl disulfide in intimate combination with the edible carrier are placed in various locations in areas where rodents are known to be living. In the form of such a composition, the poison bait is made available and attractive to the rodents, and their death is caused by a regular taking of such poisoned food bait.

Although the rodenticidal compositions of this invention are active by direct baiting of areas infested by rodents, it is highly preferred to initiate the treatment by pre-baiting. This involves laying in the rodent-infested area bait which is substantially identical to the poisoned bait with the exception that it is free of the substituted diquinolyl disulfide. The rodents feed upon this non-poisoned bait for a period, generally from about two to about seven days, before any poison bait is laid in the area. This pre-baiting treatment tends to remove from the rodent colony any reluctance to take the poisoned bait. Thus, upon the first administration of the poisoned bait, the rodents are acclimated to the bait and readily take it.

Of special advantage is the fact that the active ingredient of the rodenticidal composition of this invention is present in such small amounts that, although the lethal effect toward the rat will be retained, there will be a concomitant substantial lessening of any possible danger to domesticated animals such as cats and dogs, farm animals and the like, as well as to man himself. This factor serves to enhance the already noted toxicity difference of the diquinolyl disulfides in rodents vis-a-vis other animals.

Particularly preferred disulfides are the following:
bis(5-amino-8-quinolyl)disulfide
bis(5-acetamido-8-quinolyl)disulfide
5-acetamido-5'-diacetimido-8,8'-diquinolyldisulfide
bis(5-diacetimido-8-quinolyl)disulfide
bis(5-formamido-8-quinolyl)disulfide
bis(5-propionamido-8-quinolyl)disulfide
bis(5-trifluoroacetamido-8-quinolyl)disulfide
bis[5-(2-furamido)-8-quinolyl]disulfide The substituted diquinolyl disulfides comprising the active ingredient in the rodenticidal compositions of this invention can be prepared by methods well known to those skilled in the art. Bis(5-amino-8-quinolyl)disulfide, for example, can be prepared from readily available compounds by the following sequence:

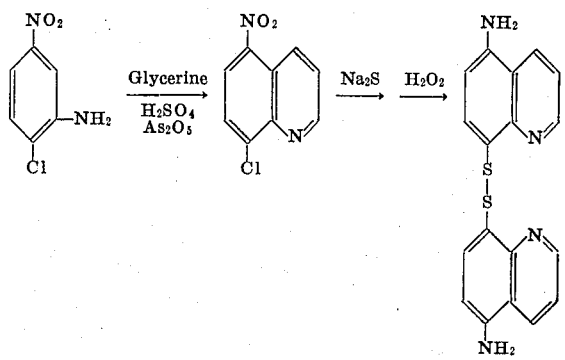

Other of the substituted diquinolyl disulfides can be prepared, for example, by acylating the bis(5-amino-8-quinolyl)disulfide in accordance with known methods.

The following preparative examples demonstrate the preparation of substituted diquinolyl disulfides which are essential components of the rodenticidal compositions of this invention.

Preparation I: Preparation of Bis(5-amino-8-quinolyl)Disulfide

To a molten stirred mixture of 117.4 g. (0.15 mole) of arsenic pentoxide, 140 g. (0.812 mole) of 2-chloro-5-nitroaniline and 240 g. (2.6 mole) of glycerine heated in an oil bath at a temperature of 140°–160°C. was added 220 g. (120 ml.) of concentrated sulfuric acid in small portions. The mixture was kept at this temperature for eighteen hours and then was cooled and poured into 1.5 liters of ice. A black solid was recovered by filtering the resulting reaction mixture. This black solid was washed thoroughly with water and dried. The desired product, 5-nitro-8-chloroquinoline, was isolated by Soxhlet extraction of the black solid for 30 hours using 3.5 liters of absolute ethanol.

The ethanol extract obtained from the Soxhlet extraction was evaporated to a small volume and allowed to stand overnight, during which time a solid crystallized from the solution. The solid was filtered, washed with ethanol and dried in a vacuum desiccator. Recrystallization from aqueous ethanol afforded 130.5 g. (77 percent) of 5-nitro-8-chloroquinoline having a melting point of 144°–144.5°C.

A solution of 147.6 g. (0.616 mole) of sodium sulfide mono-hydrate in 600 ml. of water heated in an oil bath at 140°–160°C., was treated by adding 48.4 g. (0.232 mole) of 5-nitro-8-chloro-quinoline in small portions. A suspension formed and was stirred for 16–18 hours. The hot reaction mixture was decolorized with charcoal, filtered, evaporated to small volumn and left at 0°C. for 24 hours.

A yellow solid precipitated and was filtered off, washed with ice cold water and then suspended in 240 ml. water and heated at 65°C. To this stirred suspension 80 ml. of hydrogen peroxide was added slowly during which time the temperature was kept below 65°C. The mixture was allowed to reach room temperature and the yellow solid was filtered off, washed with water, ethanol and diethyl ether. The solid was then dried in a vacuum desiccator over $P_2O_5$, producing 14.2 g. (35 percent yield) of bis(5-amino-8-quinolyl)disulfide. Recrystallization from aqueous acetone gave a yellow crystalline solid having a melting point of 226°C. (dec).

Calc. for $C_{18}H_{14}N_4S_2$: C, 61.68; H, 4.03; N, 15.98.
Found: C, 61.81; H, 4.14; N, 15.87.

Preparation II: Preparation of Bis(5-acetamido-8-quinolyl)Disulfide

To a suspension of 5.0 g. (0.014 mole) of bis(5-amino-8-quinolyl)disulfide in 30 ml. of anhydrous pyridine, 4 ml. (0.042 mole) of acetic anhydride was added dropwise at such a rate that the reaction temperature did not exceed 60°C. Upon completion of the addition of the acetic anhydride, the temperature was maintained at 60°C. for an additional hour. The solution was then cooled and a light tan solid formed and was filtered off, washed thoroughly with water, ethanol, and petroleum ether, and then dried in a vacuum desiccator over sulfuric acid. Upon recrystallization from aqueous dimethylformamide, 4.41 g. (71 percent yield) of bis(-5-acetamido-8-quinolyl)disulfide having a melting point of 288°–289.5°C. (dec.) was obtained.

Calc. for $C_{22}H_{18}N_4O_2S_2$: C, 60.82; H, 4.18; N, 12.90; O, 7.36; S, 14.75.
Found: C, 60.65; H, 4.30; N, 13.00; O, 7.35; S, 14.75.

Preparation III: Preparation of Bis(5-propionamido-8-quinolyl)-Disulfide.

To a suspension of 5.7 g. (0.016 mole) of bis(5-amino-8-quinolyl)disulfide in 60 ml of anhydrous pyridine, 8.4 ml. (0.065 mole) of propionic anhydride was added dropwise. Upon completion of the propionic anhydride addition, the solution was poured into ice. A black gum formed which was extracted with chloroform. The chloroform extract was decolorized with charcoal, dried over sodium sulfate and evaporated. Residual pyridine was removed be several treatments involving addition of water followed by evaporation. The oil was then stirred in a mixture of 10 percent ethanol in water. A solid formed which was filtered and then dried in a vacuum desiccator over sulfuric acid. Recrystallization from toluene and petroleum ether afforded 6.4 g. (85 percent yield) of bis(5-propionamido-8-quinolyl)disulfide having a melting point of 219°–220.5°C.

Calc. for $C_{24}H_{22}N_4O_2S_2$: C, 62.31; H, 4.80; N, 12.11, O, 6.92; S, 13.86.
Found: C, 62.55; H, 5.03; N, 12.14; O, 7.04; S, 13.63.

Preparation IV: Preparation of Bis(5-trifluoroacetamido-8-quinolyl)-Disulfide

About 6 g. (0.017 mole) of bis(5-amino-8-quinolyl)disulfide was suspended in 60 ml. of anhydrous pyridine. To this suspension 10 ml. of trifluoroacetic anhydride was added at such a rate that the solution temperature did not exceed 60°C. Heat was applied for an additional 17 hours to maintain the temperature of the reaction mixture at about 60°C. The solution was then cooled and poured onto ice. A brown gum formed which was extracted with chloroform. The chloroform extract was decolorized with charcoal, dried over sodium sulfate and evaporated. Residual pyridine was removed by several treatments involving addition of water followed by evaporation. The resulting red-brown solid was triturated with diethyl ether and dried under vacuum to produce 4.0 g. (44 percent yield) of a solid having a melting point 143°–148°C. (dec). Recrystallization from a mixture of dichloromethane and petroleum ether produced bis(5-trifluoroacetamido-8-quinolyl)disulfide, an off-white solid having a melting point of about 176°C. (dec).

Calc. for $C_{22}H_{12}N_4F_6O_2S_2$: C, 48.71; H, 2.23; N, 10.33; F, 21.01; S, 11.82.

Found: C, 48.59; H, 2.46; N, 10.42; F, 21.20; S, 12.03.

Preparation V: Preparation of Bis(5-formamido-8-quinolyl)Disulfide

About 2.0 g. (0.0057 mole) of bis(5-amino-8-quinolyl)-disulfide was dissolved in 40 ml. of 90 percent formic acid and heated at reflux for about 5 hours. The resulting red solution was then poured into 200 ml. of ice, and the mixture carefully added with vigorous stirring to an excess of solid potassium carbonate. The yellow solid which formed was filtered off, washed thoroughly with hot water and dried in a vacuum desiccator over $P_2O_5$. Recrystallization from aqueous ethanol afforded 1.8 g. (77.7 percent yield) of bis(5-formamido-8-quinolyl)disulfide having a melting point of 153.5°–154°C. (dec).

Calc. for $C_{20}H_{14}N_4O_2S_2$: C, 59.09; H, 3.47, N, 13.79; O, 7.87; S, 16.07.

Found: C, 59.20; H, 3.61; N, 13.86; O, 7.64; S, 16.07.

Preparation VI: Preparation of Bis[5-(2-furamido)-8-quinolyl]-Disulfide

About 7.0 g. (0.02 mole) of bis(5-amino-8-quinolyl)disulfide was suspended in about 35 ml. of anhydrous pyridine. About 5.75 g. (0.045 mole) of 2-furoyl chloride was added at a rate sufficient to maintain the temperature of the reaction mixture below 60°C. Upon completion of addition of the furoyl chloride, the reaction mixture was heated for 2 hours at 95°C., cooled to room temperature, and poured onto ice. A buff colored solid formed, was filtered off, washed successively with water and ethanol, and dried under vacuum over concentrated sulfuric acid. The solid was dissolved in boiling chloroform and rapidly filtered. On standing the chloroform solution deposited a solid which was filtered off, washed with chloroform and dried under vacuum over $P_2O_5$. Recrystallization from ethanol afforded 5.04 of bis[5-(2-furamido)-8-quinolyl]disulfide in the form of golden prismatic crystals having a melting point of about 120°C. (dec.)

Calc. for $C_{30}H_{24}N_4O_5S_2$: C, 61.63; H, 4.14; N, 9.58; O, 13.68; (as monoethanolate) S, 10.97.

Found: C, 61.50; H, 3.90; N, 9.30; O, 13.41; S, 11.14.

Preparation VII: Preparation of 5-acetamido-5'-diacetimido-8,8'-Diquinolyldisulfide About 10.68 g. (0.025 mole) of bis(5-acetamido-8-quinolyl)-disulfide was suspended in a mixture of 120 ml. of pyridine and 2.35 ml. (0.026 mole) of acetic anhydride, and the mixture was heated under reflux for 23 hours. At the end of this period, solvent was removed in vacuo and the residue triturated with chloroform. About 5.4 g. of starting material was removed by filtration from the chloroform-triturated mixture. The filtrate was then chromatographed on silica gel using 2 liters of a 90:10 mixture of chloroform and petroleum ether to develop the column and chloroform alone as eluant. Fractions of 100 milliliters each were collected. About 2.3 g. of 5-acetamido-5'-diacetimido-8,8'-diquinolyldisulfide was isolated from fractions 14–45. Recrystallization from a mixture of chloroform and petroleum ether afforded pure material having a melting point of 210°–212°C. Calc. for $C_{24}H_{20}N_4O_3S_2$: C, 60.48; H, 4.23; N, 11.76.

Found: C, 60.27; H, 4.29; N, 11.73.

Preparation VIII: Preparation of Bis(5-diacetimido-8-quinolyl)-Disulfide

About 12.25 g. (0.035 mole) of bis(5-amino-8-quinolyl)-disulfide was dissolved in 100 ml. of anhydrous pyridine. About 25 ml. of acetic anhydride was added dropwise to the stirred solution. The solution was then refluxed for 3 hours and maintained at 100°C. for a further 21 hours. The resulting reaction mixture was cooled and poured onto ice with formation of a solid which was filtered off, washed with water and dried under vacuum over sulfuric acid. The solid was dissolved in boiling chloroform, filtered, and passed down a column of 100–200 mesh silica using chloroform as eluant. The first main fraction was collected, evaporated to a residual oil which produced 4.5 g. of a solid on trituration in ether. Recrystallization of the solid from a mixture of toluene and petroleum ether produced 2.9 g. of bis(5-diacetimido-8-quinolyl)disulfide in the form of a white solid having a melting point of 246°–247°C.

Calc. for $C_{26}H_{22}N_4O_4S_2$: C, 60.22; H, 4.27; N, 10.81; O. 12.34; S, 12.36.

Found: C, 60.40; H, 4.23; N, 10.71; O, 12.20; S, 12.09.

The following examples illustrate the preparation of rodenticidal compositions of this invention.

EXAMPLE 1

A rodenticidal composition was prepared by adding to whole meal flour 0.1 percent bis(5-acetamido-8-quinolyl)disulfide and 0.05 percent chlorazol sky blue, based upon the weight of the flour. The resulting mixture was blended thoroughly in a mixer for a period sufficient to achieve a substantially uniform distribution of the ingredients.

EXAMPLE 2

A rodenticidal composition was prepared by adding to damp, coarse oatmeal 0.03 percent by weight of bis-(5-acetamido-8-quinolyl)-disulfide, 5 percent sugar, and 0.05 percent by weight of chlorazol sky blue. The mixture was blended thoroughly in a mixer for a period sufficient to achieve a substantially uniform distribution of the ingredients.

EXAMPLE 3

A rodenticidal composition is prepared using as edible carrier a mixture of 95 percent oatmeal and 5 percent corn oil. To this carrier is added, based upon the weight of the carrier, 0.1 percent of bis(5-diacetimido-8-quinolyl)disulfide, 5 percent sugar, and 0.05 percent chlorazol sky blue. The mixture is blended thoroughly in a mixer for a period sufficient to achieve a substantially uniform distribution of the ingredients.

EXAMPLE 4

A rodenticidal composition is prepared by adding to wheat about 0.3 percent by weight of bis(5-trifluoroacetamido-8-quinolyl)-disulfide and 5 percent by weight sugar. The mixture is blended thoroughly in a mixer for a period sufficient to achieve a substantially uniform distribution of the ingredients.

EXAMPLE 5

A rodenticidal composition is prepared by adding to small pieces of bread about one-fourth inch in size about 0.03 percent of bis(5-formamido-8-quinolyl)disulfide based on the weight of the bread. The mixture is blended thoroughly in a mixer for a period sufficient to achieve a substantially uniform distribution of the diquinolyl disulfide in the bread.

The rodenticidal activity of the substituted diquinolyl disulfides present as active ingredient in the rodenticidal composition of this invention will be apparent from the results depicted in the table following. In the table the compounds listed by letter designation are as follows:

A — Bis(5-amino-8-quinolyl)disulfide
B — Bis(5-formamido-8-quinolyl)disulfide
C — Bis(5-acetamido-8-quinolyl)disulfide
D — Bis(5-propionamido-8-quinolyl)disulfide
E — Bis [5(2-furamido)-8-quinolyl]disulfide
F — Bis(5-trifluoroacetamido-8-quinolyl)disulfide
G — 5-Acetamido-5'-diacetimido-8,8'-diquinolyldisulfide
H — Bis(5-diacetimido-8-quinolyl)disulfide In the testing for rodenticidal activity each compound was administered orally to a group of five rats at the designated concentration and for the term specified. The compound was administered to the rat either as a single dose of 100 milligrams per kilogram of body weight of the rat or as two or four daily doses each of 10, 50 or 100 milligrams per kilogram of body weight of the rat.

The rats were carefully observed during the period of administration of the compounds and subsequent thereto. As hereinbefore indicated, it is important that a rodenticide which is based on a multiple feeding technique be such that any physiological reaction experienced by the rodent be sufficiently delayed to assure ultimate ingestion by the rodent of a lethal quantity of the poison. This delaying property is evident from the data presented in the Table. A delay of at least two days and most often three days prior to expiration of any of the rats was experienced. Correspondingly, a definite indication of the lethality of the defined diquinolyldisulfides is shown since rates expired beginning on the third and fourth days after initial administration.

FIELD ACTIVITY OF SUBSTITUTED DIQUINOLYLDISULFIDES

Two field trials were conducted to determine the activity of the subject compounds against rats in farm buildings. The bait which was used consisted of damp, coarse oatmeal containing 5 percent sugar and 0.05 percent chlorazol sky blue and bis(5-acetamido-8-quinolyl)disulfide. In field trial I, 0.1 percent of the diquinolyldisulfide was used and in field trial II 0.03 percent was used. Bait lacking any diquinolyldisulfide was laid daily at each site for eight successive days. At the termination of the prebaiting period, the baits containing the diquinolyldisulfide were used and laid at each site on a daily basis.

In field trial I, on the first day on which bait was furnished containing the diquinolyldisulfide, the rats ate about 64 percent as much bait as they had previously eaten on any day during pre-baiting. Nearly as much bait was eaten on the second day as on the first, but on the third day the bait consumption was reduced by about one-half. From the fourth to the tenth day no further bait was taken by the rats, and no traces of any rat activity whatever was apparent.

TABLE
RODENTICIDAL ACTIVITY OF DIQUINOLYLDISULFIDES

| Compound | Dosage Amt./day[a] | Days | Percent Mortality, Days Since Initial Administration | | | | | | |
|---|---|---|---|---|---|---|---|---|---|
| | | | 1 | 2 | 3 | 4 | 5 | 6 | 7 |
| A | 5 | 4 | 0 | 0 | 0 | 0 | 0 | 20 | 20 |
|   | 10 | 4 | 0 | 0 | 0 | 0 | 60 | 100 | — |
|   | 100 | 1 | 0 | 0 | 0 | 20 | 20 | 20 | 20 |
|   | 100 | 2 | 0 | 0 | 0 | 0 | 80 | 100 | — |
| B | 10 | 4 | 0 | 0 | 0 | 60 | 80 | 100 | — |
|   | 100 | 1 | 0 | 0 | 20 | 40 | 40 | 40 | 40 |
|   | 100 | 4 | 0 | 0 | 20 | 60 | 100 | — | — |
| C | 10 | 4 | 0 | 0 | 0 | 0 | 0 | 0 | 0 |
|   | 100 | 1 | 0 | 0 | 0 | 0 | 0 | 0 | 0 |
|   | 100 | 4 | 0 | 0 | 0 | 40 | 80 | 100 | — |
| D | 10 | 4 | 0 | 0 | 0 | 0 | 0 | 0 | 0 |
|   | 100 | 1 | 0 | 0 | 0 | 0 | 40 | 40 | 40 |
|   | 100 | 4 | 0 | 0 | 0 | 0 | 80 | 100 | — |
| E | 10 | 4 | 0 | 0 | 0 | 0 | 0 | 0 | 0 |
|   | 100 | 1 | 0 | 0 | 0 | 0 | 0 | 0 | 0 |
|   | 100 | 4 | 0 | 0 | 0 | 80 | 100 | — | — |
| F | 10 | 4 | 0 | 0 | 0 | 20 | 20 | 20 | 20 |
|   | 100 | 4 | 0 | 0 | 0 | 0 | 40 | 80 | 80 |
| G | 100 | 4 | 0 | 0 | 0 | 40 | 40 | 40 | 40 |
| H | 10 | 4 | 0 | 0 | 0 | 0 | 0 | 0 | 0 |
|   | 100 | 1 | 0 | 0 | 20 | 20 | 20 | 20 | 20 |
|   | 50 | 4 | 0 | 0 | 20 | 60 | 100 | — | — |
|   | 100 | 4 | 0 | 0 | 20 | 60 | 80 | 100 | — |

[a] Milligrams per kilogram body weight of the rat.

In field trial II using bait containing 0.03 percent of the diquinolyldisulfide, the rats fed on the bait for the first three days and in general ceased to take the bait after this time. Dead rats were recovered at every site at which the bait was placed; however, extermination of all the rats was not accomplished at this dosage level, since some rat activity continued to be noted at the most heavily infested area. However, no dead animals other than rats were observed in either of the field trials.

From the above activity data including the field testing results, it is evident that the substituted diquinolyl-disulfides defined by the present invention are highly effective as rodenticides and accomplish the clearing of areas having heavy rodent infestation with both safety and convenience.

I claim:

1. A method of controlling a rodent population which comprises exposing said population to a rodenticidally effective amount of a substituted diquinolyl-disulfide of the formula

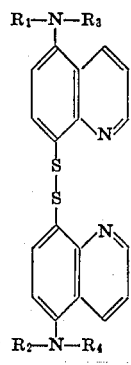

in which $R_1$ and $R_2$ are hydrogen or

in which R is selected from the group consisting of hydrogen, methyl, ethyl, trifluoromethyl and 2-furyl, and $R_3$ and $R_4$ each are independently selected from the group consisting of hydrogen, formyl, acetyl, 2-furoyl, trifluoroacetyl and propionyl.

2. The method of claim 1, in which, in the substituted diquinolyldisulfide, $R_1$ and $R_2$ are

R is methyl and $R_3$ and $R_4$ independently are hydrogen or acetyl.

3. The method of claim 1, in which the substituted diquinolyldisulfide is bis (5-acetamido-8-quinolyl)disulfide.

* * * * *